Patented Mar. 16, 1926.

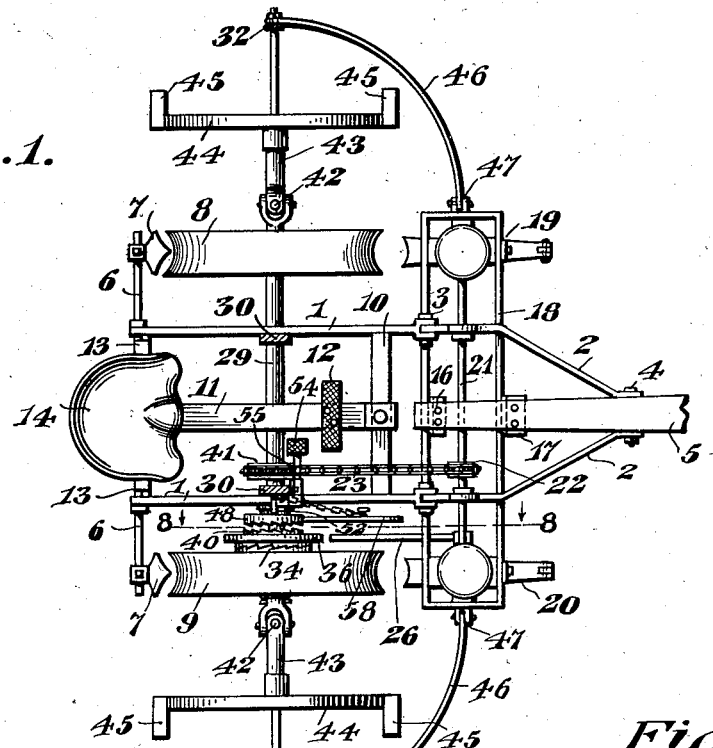
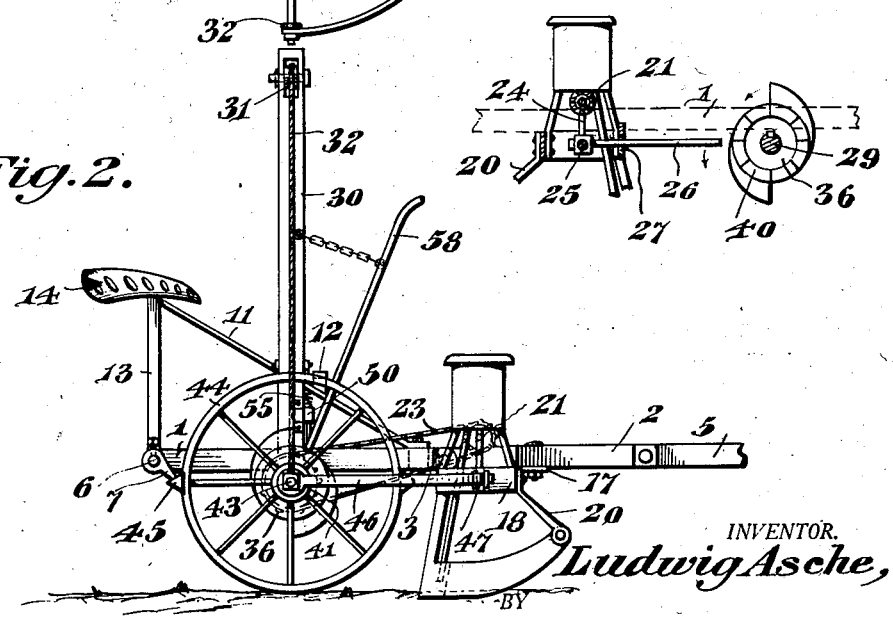

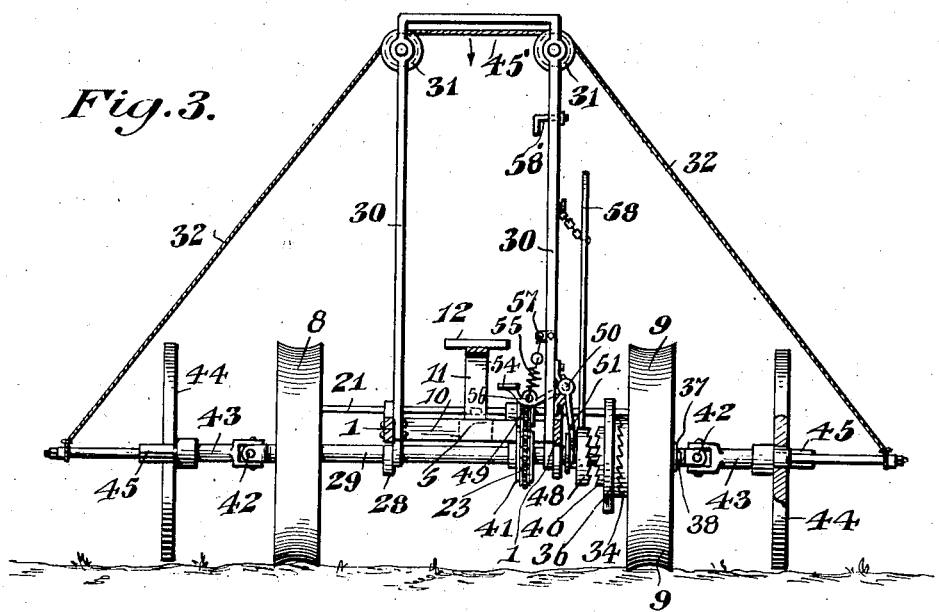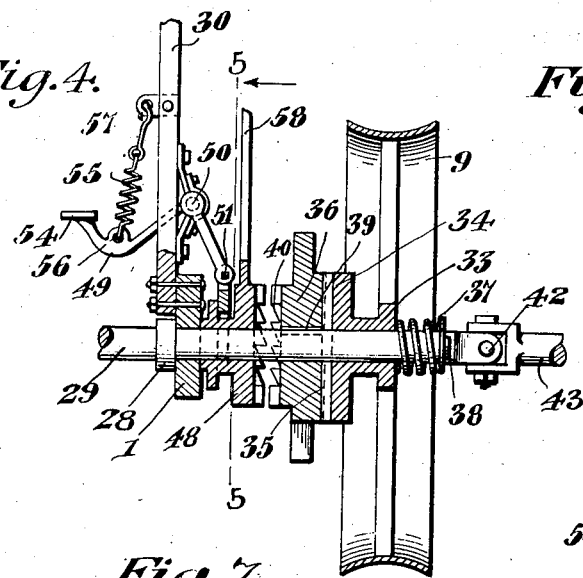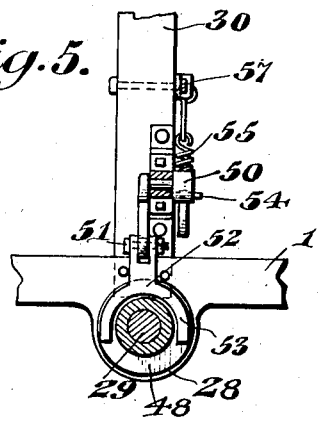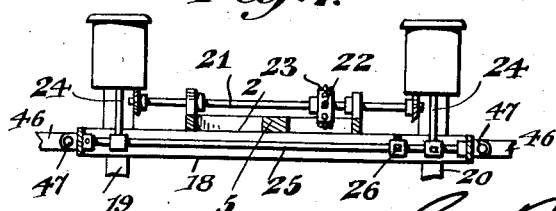

1,577,156

UNITED STATES PATENT OFFICE.

LUDWIG ASCHE, OF LEIGH, NEBRASKA.

PLANTER.

Application filed November 7, 1925. Serial No. 67,583.

*To all whom it may concern:*

Be it known that I, LUDWIG ASCHE, a citizen of the United States, residing at Leigh, in the county of Colfax and State of Nebraska, have invented certain new and useful Improvements in Planters, of which the following is a specification.

This invention relates to agricultural machines, more particularly to a corn planter of the marker type, and has for its object to provide, in a manner as hereinafter set forth, a planter with spot market devices adjustable relatively to the ground wheels of the machine for keeping the rows of hills of corn properly aligned during the planting operation when the planter travels back and forth across the field.

A further object of the invention is to provide, in a manner as hereinafter set forth, a corn planter of the marker type, having spot marking devices and further with means whereby said devices can be elevated clear of the ground, at the end of a row to permit of the machine being turned in the smallest possible space without injuring the protruding markers of the said devices.

Further objects of the invention are to provide, in a manner as hereinafter set forth, a corn planter of the marker type, which is simple in its construction and arrangement, strong, durable, compact, thoroughly efficient in its use, conveniently operated, and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a sectional plan of a planter in accordance with this invention.

Figure 2 is a side elevation thereof.

Figure 3 is a rear elevation thereof.

Figure 4 is a fragmentary view, on an enlarged scale, in vertical section, of the adjusting mechanism for the marker devices.

Figure 5 is a section on line 5—5, Figure 4.

Figure 6 is a fragmentary view, in plan, of the foot operated lever forming an element of the adjusting mechanism for the marker devices.

Figure 7 is a fragmentary view, in rear elevation, of a duplex planting means.

Figure 8 is a fragmentary view, in side elevation, of the duplex planting means and further illustrating the cam for operating the seed dropping means.

Referring to the drawings in detail, the body of the planter comprises a frame formed of two sections 1, 2, secured together, as at 3. The section 1 is rectangular in contour and the section 2 has its forward portion tapered. The section 1 is the rear portion of the frame and said section 2 at its forward end is connected, as at 4, to the tongue 5. The rear of the section 1, has fixedly secured therewith a transversely extending supporting bar 6 having each end provided with a scraper 7 for a ground wheel, and these latter are indicated at 8, 9. The section 1 is provided with a cross bar 10 near its forward end, and fixed thereto as well as to the rear of the section 1 is a longitudinally extending inclined support 11 provided with a foot rest 12. Seat supports are indicated at 13 and provided at the upper ends with a seat 14 and to the latter is secured the support 11.

Arranged below the rear portion of the section 2, as well as being suspended from the tongue 5 by the hold-fast devices 16 and 17 is a supporting frame 18 for a pair of planting devices 19, 20, and common thereto is an actuating shaft 21 for the seed dispensing devices. The shaft 21 is journalled in the section 2 of the main frame of the machine and is arranged over the tongue 5. The shaft 21 carries a sprocket pinion 22 engaged and operated by a driving belt 23, which extends rearwardly from the shaft 21 and is operated through a means to be presently referred to. Each of the devices 19 and 20 includes a depending element 24 to provide for the discharge of the seeds and the said elements 24 are carried by a rock shaft 25 common thereto and journalled in the ends of the frame 18. The shaft 25 is provided with a forwardly extending actuating arm 26 therefor operated in a manner to be presently referred to.

The foregoing elements are of known construction and are illustrated by way of example to show an organized machine. As the section 2 is hinged to the section 1, the tongue 5 secured to the section 2 and also secured to the frame 18, the pair of planting devices can be elevated when desired. The forward part of the frame 18 is provided with a slot 27 for the passage of the arm 26, which projects forwardly from said frame and in the path of an operating means therefor and which will be presently referred to.

Journalled in the bearings 28, which depend from the section 2 of the main frame of the machine, is an axle 29, and fixed to the section 2 is a vertically extending inverted yoke-shaped member 30 provided near its upper end with a pair of pulleys 31 upon which travels an elevating member 32, such as a cable and the function of which will be presently referred to.

The ground wheels 8 and 9 are loosely mounted on the axle 29, exteriorly of the section 2 of the main frame of the machine. Any suitable means can be employed to prevent the shifting of the wheel 8 lengthwise of the axle 29. The wheel 9 is spring controlled and under normal conditions is clutched to the shaft 29 and for such purpose said wheel 9 has its hub 33 formed at one end with a toothed clutching disk 34, maintained in normal clutching position with one of the toothed faces 35 of a cam element 36, through the medium of a spring 37, which is interposed between the hub 33 and an abutment 38 carried by the axle 29. The cam element 36 is keyed to the axle 29, as at 39, and the other toothed face of said member 36 is indicated at 40. The element 36 is employed for actuating the arm 26 to rock the shaft 25 to provide for the dropping of the seeds from the planting devices. Carried by the axle 29 is a sprocket wheel 41 for operating the endless driving member 23 for the pinion 22 on the shaft 21.

Universally connected with each end of the axle 29, exteriorly with respect to the ground wheels, as at 42, is an axle extension 43 having fixed thereon, intermediate its ends, a marker device consisting of a wheel 44, provided with spaced circumferentially extending markers 45 of any suitable form. The axle extensions 43 bodily revolve with the axle 29. The cable 32 has its ends connected to the ends of the axle extensions 43, whereby when the cable 32 is pulled downwardly in the direction of the arrow 45', the axle extensions 43 will be elevated, carrying the marker devices therewith. By this arrangement when the machine reaches the end of a row the marker devices can be elevated and the machine turned in the smallest possible space without injuring the rows or the markers of the marker devices. Steadying members are provided for the axle extensions 43 and the said members are indicated at 46 and each of which is pivoted at its forward end, as at 47, to an end of the frame 18 and has its rear end connected with the outer end of an axle extension.

The setting up of the marker devices with respect to the planting devices and also with the relation of the cam element 36 with respect to the arm 26, is such that if the spots made by the markers are in line transversely the hills will be in alignment in that direction, but if at any time it be discovered that the spots or marks which the machine is making are out of alignment with the previous spots or marks, it will be evident that the marker devices must be adjusted or otherwise the spots will be out of alignment with the other hills. To provide for such adjustment, the machine includes means operating in conjunction with the cam element 36 for adjusting the marker devices relative to the ground wheel 9. The means to provide for such adjustment consists of a toothed clutching member 48 slidably mounted on the axle 29 and coacting with the toothed face 40 of the cam element 36. The clutching member 38 is operated through the medium of a foot actuated spring controlled lever 49, which is pivotally connected, intermediate its ends, as at 50, to one of the arms of the inverted yoke 30. One end of the lever 49 is pivotally connected, as at 51, to the stem 52 of an inverted yoke-shaped shifting member 53 for the clutching member 48. The foot tread of the lever 49 is indicated at 54, and the controlling spring for the lever 49 at 55. One end of the spring 55 is connected, as at 56, to the lever 49 between the foot tread 54 and pivot 50, and the other end of the spring 55 is connected, as at 57, to that arm of the member 30 to which the lever 49 is pivoted. The lever 49 is what may be termed the elbow-shaped type. Formed integral with the clutch member 48 is a vertically disposed shifting arm 58 therefor.

When making the adjustment, the clutch member 48 is shifted to engage the toothed face 40 of the cam element 36. When the member 48 is in engagement with the element 36, the former is shifted by the arm 58 which carries the element 36 and axle 29 therewith. This turning movement carries the marker devices with the axle 29 and places the marker devices in proper alignment with the previous marks. When the arm 58 is forced forwardly the cam element 36 is rotated and the clutching teeth of the face 35 snap past the teeth on the disk 34, whereby the clutch member 48, cam element 36, axle 29 and marker devices are bodily turned independently of either of the ground wheels 8 or 9, and this relative movement is made possible by the clutch structure aforesaid. When driving across the field the clutch member 48 is clear of the cam element 36, as when driving pressure is removed from the lever 49 and under such conditions the action of the spring 55 will shift the lever 49 to inactive position and when shifted to inactive position the clutch member 48 will be moved clear of the teeth 40 of the cam element 36.

One of the arms of the member 36 is provided with a holding element 58' for retaining the cable 32 from movement when the latter is pulled to elevate the marker devices and axle extensions.

It is thought the many advantages of an agricultural machine, in accordance with this invention, can be readily understood, and although the preferred embodiment of the invention is as illustrated and described, yet it is to be understood that changes in the details of construction can be had which will fall within the scope of the invention as claimed.

What I claim is:—

1. A planter of the type described comprising an axle, a revoluble wheel loosely mounted thereon, said wheel having the inner end of its hub toothed, a marker device fixed to the axle, an element fixed to the axle and having one of its faces toothed for clutching engagement with said wheel in one direction and having its other face oppositely toothed, spring controlled means for normally urging said wheel and said element together in driving relation when the machine is moving ahead, a toothed revoluble member loosely and slidably mounted on said axle and having a toothed face adapted to operatively engage the other face of said element for rotation in the same direction, and means for revolving said member whereby the element may be rotated past the one way clutch teeth of the wheel to provide for the adjustment of the axle and marker relative to the wheel.

2. A planter of the type described comprising an axle, a revoluble wheel loosely mounted thereon, said wheel having the inner end of its hub toothed, a marker device fixed to the axle, a cam fixed to the axle and having one of its faces toothed for clutching engagement with said wheel in one direction and having its other face oppositely toothed, seed depositing devices including a shaft having a rock arm in the path of said cam, spring controlled means for normally urging said wheel and said cam together in driving relation when the machine is moving ahead, a toothed revoluble member loosely and slidably mounted on said axle and having a toothed face adapted to operatively engage the other face of said cam for rotation in the same direction, and means for revolving said member whereby the cam may be rotated past the one way clutch teeth of the wheel to provide for the adjustment of the cam and marker relative to the wheel.

In testimony whereof, I affix my signature hereto.

LUDWIG ASCHE.